United States Patent [19]
Breton et al.

[11] Patent Number: 5,156,675
[45] Date of Patent: Oct. 20, 1992

[54] INK FOR INK JET PRINTING

[75] Inventors: Marcel P. Breton, Mississauga; Fatima M. Pontes, Kitchener; Kerstin M. Henseleit, Toronto; Barbel Helbrecht; Melvin D. Croucher, both of Oakville; Raymond W. Wong, Mississauga, all of Canada

[73] Assignee: Xerox Corporation, Stamford, Conn.

[21] Appl. No.: 701,231

[22] Filed: May 16, 1991

[51] Int. Cl.$^5$ .............................................. C09D 11/00
[52] U.S. Cl. ........................................ 106/22; 106/20
[58] Field of Search .................................. 106/22, 20

[56] References Cited

U.S. PATENT DOCUMENTS

| | | | |
|---|---|---|---|
| 4,021,252 | 5/1977 | Banczak et al. | 106/30 |
| 4,150,997 | 4/1979 | Hayes. | |
| 4,163,001 | 7/1979 | Carumpalos et al. | |
| 4,281,329 | 7/1981 | Yano et al. | 346/1.1 |
| 4,378,564 | 3/1983 | Cross et al. | |
| 4,508,570 | 4/1985 | Fujii et al. | |
| 4,740,549 | 4/1988 | Okuzono et al. | |
| 4,793,860 | 12/1988 | Murakami et al. | 106/22 |
| 4,838,938 | 6/1989 | Tomida et al. | |
| 4,889,877 | 12/1989 | Seitz. | |
| 5,100,469 | 3/1992 | Pontes et al. | 106/20 |

FOREIGN PATENT DOCUMENTS 55-65269  5/1980  Japan.
165470  7/1988  Japan.

OTHER PUBLICATIONS

C. T. Ashley, "Development and Characterization of Ink for an Electrostatic Ink Jet Printer", Jet Printer Ink, pp. 69-74, Jan. 1977.
A. Naka et al, "Ability of Surfactants to Form Highly Loaded Coal-Water Mixtures", JAOCS, vol. 65, No. 7 (Jul. 1988), pp. 1194-1201.
"The JEFFAMINE Polyoxyalkyleneamines"—Texaco Chemical Company, 1987.
M. Ozaki et al, "Fixing Time of Ink-Jet Inks on Plain Paper" SPIE vol. 1079 Hard Copy Output (1989), pp. 384-388.
Alkateric—Amphoterics, pp. 18-19.
Rexol 130—Technical Bulletin TM-86-008, pp. 1-4.

*Primary Examiner*—William R. Dixon, Jr.
*Assistant Examiner*—Margaret V. Einsmann
*Attorney, Agent, or Firm*—Oliff & Berridge

[57] ABSTRACT

Fast drying ink compositions contain a colorant, a dye, water and a cosolvent. Some of the ink compositions dry in less than about 1 second and have a viscosity of between about 1.6 and about 2.5 centipoise and a specified surface tension. Some of the ink compositions contain specified cosolvents, preferably a mixture of diethylene glycol monobutyl ether and glycerol.

22 Claims, No Drawings

INK FOR INK JET PRINTING

FIELD OF THE INVENTION

This invention relates to ink jet printing, and more particularly, to ink compositions for ink jet printers.

BACKGROUND

Ink compositions, especially those for use with ink jet printers, must satisfy a number of conditions in order to achieve acceptable printing.

The ink composition should possess properties which permit it to be jetted appropriately from an ink jet printer. In ink jet printing, droplets of ink are expelled from nozzles onto a recording medium. The ink should form a meniscus at each nozzle prior to being expelled in the form of a droplet. After a droplet is expelled, additional ink surges to the nozzle to reform the meniscus. Important properties of the ink in this context include the ink's viscosity and surface tension.

Generally, adjustment of the viscosity of an ink composition can negatively affect the print quality and/or drying time of the ink. This may result in excessive feathering or wicking along the paper fibers due to capillary action, and longer drying times at higher viscosity. Adjustments to the surface tension to improve a certain characteristic of the ink may adversely affect other characteristics thereof.

In many applications, fast drying inks are desired. The drying time of an image can limit both the speed and the architecture of an ink jet printer. Faster drying inks allow one to design a faster printer which would not constrain its architecture. However, the drying time of the ink should not be such that it dries in the nozzle of the ink jet printer, thus clogging the nozzle. On the other hand, slow drying inks have limited use in printers requiring high throughput.

Printing different colored inks next to each other often results in intercolor bleeding with conventional inks. Thus, it would be desirable if inks could be formulated which dried instantaneously to minimize intercolor bleeding. Accordingly, fast drying inks are desirable, especially in conjunction with color ink jet printers.

Drying time and print quality of an ink may be affected by the material on which the ink is applied. For example, paper is often sized with sizing components for the purpose of retarding or preventing penetration of liquids into the structure. This is commonly done by introducing a material to the pulp during the paper making operation. Paper may be sized internally or on the surface. Acid sizing chemicals, such as Mon size available from Monsanto Chemical Company, or alkaline sizing chemicals, such as Hercon-76 available from Hercules Company, are precipi-tated onto the fibers primarily for the purpose of controlling penetration of liquids into the final dry paper. This process is known as internal sizing. Surface sizing involves the application of dispersions of film-forming substances such as converted starches, gums and modified polymers to previously formed paper. Surface sizing imparts strength to the paper and thus high quality printing papers are often surface sized as well. These and other materials tend to adversely affect the manner in which a particular ink dries.

As used herein, the term "plain paper" represents all standard office and xerographic paper except for photographic and thermal paper.

Tomida et al U.S. Pat. No. 4,838,938 discloses a recording liquid comprising a special host molecule with inclusion ability, a dye, a liquid medium, a dispersing agent, a surfactant, a viscosity controller, and a surface tension controller. The liquid medium may comprise water and/or organic solvent. Organic, solvents include isopropyl alcohol and 1-methyl-2-pyrrolidone. The surfactant may comprise cationic, anionic or nonionic surfactant. The viscosity controller may comprise polyvinyl alcohol, celluloses, water soluble resins, etc. The surface tension controller may comprise diethanolamine, triethanolamines, etc. A preferred viscosity at 25° C. is 5 centipoise or less, more preferably 3 centipoise or less, with a surface tension of 35 to 65 dynes/cm.

Koike et al U.S. Pat. No. 4,923,515 discloses an ink composition comprising water, an organic solvent, a dye, surfactants, viscosity controllers, and surface tension controllers. The organic solvents may comprise alkyl alcohols, amides, ketones or ketoalcohols, ethers, alkylene glycols, etc.

Schick et al U.S. Pat. No. 4,847,316 discloses an ink composition comprising a homogeneous blend of water dispersible polyurethane, water dispersible polyester, a solvent system containing water or water admixed with a cosolvent. The cosolvent may include diethylene glycol monomethyl ether, diethylene glycol, n-propyl alcohol, diethylene glycol monoethyl ether, diethylene glycol monopropyl ether, and diethylene glycol monobutyl ether. Water comprises at least about 90.0 weight percent of the solvent system.

Hayes U.S. Pat. No. 4,150,997 discloses an ink composition comprising an aqueous solution, a dye solubilizer, and butyl carbitol. The percentage by weight of butyl carbitol may be from about 5 to 7 percent. The butyl carbitol acts as a dye stabilizer and wetting agent.

Carumpalos et al U.S. Pat. No. 4,163,001 discloses an ink composition comprising a laked alkali stable basic dye wherein the laking agent is dispersed in a liquid medium having butyl carbitol, water, a nonionic surfactant, and an amino alcohol.

Cross et al U.S. Pat. No. 4,378.564 discloses an ink composition comprising water, dye, and glycol ether. The glycol ether may include butyl cellosolve (glycol monobutyl ether), butyl carbitol, and mixtures thereof.

Fugii et al U.S. Pat. No. 4,508,570 discloses an aqueous ink component comprising a water-soluble dye, a polyhydric alcohol and/or an alkyl ether, water, and at least one water-soluble non-ionic surface active agent. The non-ionic surface active agent may comprise a polyoxyethylene alkyl amine, a polyoxyethylene alkyl phenyl ether or a polyoxyethylene alkyl ether.

Okuzono et al U.S. Pat. No. 4,740,549 discloses a wipe-erasable ink composition for a writing board, and is thus irrelevant to ink jet inks. The ink composition comprises a dye, an organic solvent, and a non-ionic surface active agent. The nonionic surface active agent may include polyoxyethylene sorbitol monostearate, polyoxyethylene oleyl ether, polyoxyethylene stearyl ether, etc.

U.S. Pat. No. 4,889,877 to Seitz discloses a printing ink composition comprising water, a non-volatile diluent, oil-containing microcapsules, a protective colloid blend, and a binder emulsion or alkali soluble resin. The non-volatile diluent may comprise methyl glucoside, dimethyl urea, sorbitol, erythritol, and polyoxyethylene polyols.

U.S. Pat. No. 4,836,852 to Knirsch et al. discloses an ink composition comprising a dye in a mixture of water and glycol wetting agents. The dye may include solubilizing agents such as N-methyl pyrrolidone and derivatives thereof. A surface tension of between 35 and 40 dynes/cm is disclosed.

Although the ink compositions of the prior art provide inks with certain advantageous qualities, it is desirable to provide inks having fast drying times and good print quality.

SUMMARY OF THE INVENTION

It is an object of the invention to provide ink compositions having fast drying times while maintaining good print quality.

It is another object of the invention to provide fast drying inks having high frequency responses.

A further object of the invention is to provide inks having acceptable water fastness and latency properties.

The present invention achieves these and other objects by providing fast drying ink compositions (drying in less than about one second on plain paper) comprising a dye, water and a cosolvent. The ink compositions preferably contain about 5 to about 40 percent by weight of the cosolvent and have a surface tension of less than about 42 dynes/cm, preferably less than 35 dynes/cm or between 32 and 40 dynes/cm, and a viscosity of about 1.6 to about 3.0, preferably about 2.5, centipoise. Preferred embodiments include specified cosolvents, preferably a mixture of diethylene glycol monobutyl ether and glycerol.

DETAILED DESCRIPTION OF PREFERRED EMBODIMENTS

The present invention provides ink compositions having fast drying times and good print quality. Generally, the ink compositions of the present invention comprise an ink vehicle, such as water or a mixture comprising water and a water soluble or water miscible organic solvent, and a colorant soluble in the ink vehicle. The ink composition may be free of host molecules having inclusion ability.

Ink compositions of the invention may contain about 50% to about 92% by weight of water and about 2% to about 40% by weight of at least one water miscible cosolvent as the ink vehicle, about 2% to about 8% by weight of colorant, and about 5% to about 10% by weight of optional additives.

A preferred fast drying ink composition of the invention comprises water, water soluble dye, and about 2% to about 40% by weight, more preferably at least 5%, even more preferably about 10% to about 25% by weight, of at least one cosolvent, and has a viscosity of about 1.6 to about 2.5 centipoise, a surface tension of less than about 40 dynes/cm, preferably less than 35 dynes/cm or between 32 and 40 dynes/cm, and a drying time of less than about 1 second on plain paper. (Viscosity values herein are measured at 25° C.) More preferably, the ink dries in less than about 0.6 second (normalized to 80 pL drop volume) on plain paper, and optimally dries in about 0.2 to about 0.6 seconds. In one particularly preferred embodiment, the cosolvents lower the drying time without the need for surfactants. The inks preferably have a high frequency response, for example, Fmax≧5 kHz. Fmax is the maximum frequency at which the ink jet ink can be jetted from the ink jet printhead. Frequencies higher than 5 kHz are usually obtained with inks of low viscosity, preferably lower than 2 centipoise. In this embodiment, a cosolvent such as diethylene glycol monobutyl ether may be present in a concentration as low as 2 or 3% by weight.

Cosolvents which may be utilized in preferred embodiments of the present invention include propylene carbonate, ethylene carbonate, 1-cyclohexyl-2-pyrrolidone, diethylene glycol monobutyl ether, isopropanol, 1-methyl-2-pyrrolidone, 2-amino-2-methyl-1-propanol, methyl diethanol amine, pyrazole, benzyl alcohol, 1,3-dimethyl-2 imidazolidinone, propylene glycol monomethyl ether, dipropylene glycol monomethyl ether, tripropylene glycol monomethyl ether, propylene glycol mono-t-butyl ether, ethylene glycol ethyl ether acetate, ethylene glycol methyl ether acetate, ethylene glycol butyl ether, diethylene glycol butyl ether and its acetate, propylene glycol methyl ether acetate, dipropylene glycol methyl ether acetate, tripropylene glycol methyl ether acetate, and mixtures thereof. High molecular weight glycols, for example, glycerol, D-sorbitol, ethylene glycol, propylene glycol and the like, and propylene glycol ethers and acetates, may be used in an amount from about 0.1% to about 15% by weight, preferably about 1% to about 8% by weight, to improve latency.

In another preferred embodiment, the cosolvent is selected from the group consisting of propylene carbonate, ethylene carbonate, 1-cyclohexyl-2-pyrrolidone, 2-amino-2-methyl-1-propanol, pyrazole, benzyl alcohol, ethylene glycol ethyl ether acetate, ethylene glycol methyl ether acetate, ethylene glycol butyl ether, diethylene glycol butyl ether acetate, propylene glycol methyl ether acetate, dipropylene glycol methyl ether acetate, tripropylene glycol methyl ether acetate, and mixtures thereof. Use of these cosolvents may permit one to expand beyond the specific parameters discussed with respect to the previous embodiment while still achieving highly satisfactory results. For example, suitable parameters for these embodiments may include surface tensions of about 28 to 42 dynes/cm and viscosities of about 1.05 to about 3.0 centipoise.

It has been observed that the addition of diethylene glycol monobutyl ether (hereinafter "DEG-MBE," also known as butyl carbitol) and glycerol as the cosolvent to ink compositions provides preferable fast drying inks. The addition of DEG-MBE and glycerol allows for an increase in the viscosity of the ink and a decrease in the drying time. In this embodiment, the ink composition may have a viscosity ranging from about 1.45 centipoise to about 2.55 or even 3.0 centipoise, and preferably less than about 2.2 centipoise. Ink compositions having a similar viscosity but not containing DEG-MBE and glycerol have significantly longer drying times. The surface tension of the inks of the invention containing DEG-MBE and glycerol may range from about 28 dynes/cm to about 40–45 dynes/cm, and preferably may range from about 33 dynes/cm to about 40 dynes/cm.

DEG-MBE may be present in the ink composition in an amount ranging from about 3 to about 40% by weight, preferably about 7 to about 25% by weight. Glycerol may be present in the ink composition in an amount ranging from about 3 to about 16% by weight, preferably about 4 to about 10% by weight. The ratio of DEG-MBE to glycerol is preferably about 60:40 for optimum print quality. Generally, these ink compositions may contain about 50% to about 90% by weight of the ink vehicle, about 2.5% to about 8% by weight of the colorant, and about 8% to about 25% by weight of the combination of diethylene glycol monobutyl ether and glycerol as the cosolvent, and about 0% to about 10% by weight of other additives, based on weight of the total composition.

The addition of DEG-MBE and glycerol to an ink composition permits inks which have significantly shorter drying times (less than 1 second), have improved jettability when compared to lower viscosity inks, have minimized intercolor bleeding, and are compatible with dyes used in the ink compositions.

Use of some of the subject cosolvents may permit the present ink compositions to be free of surfactant and still obtain an appropriate surface tension (e.g., 28–42 or less than 35 dynes/cm). However, the above inks may also contain conventional or polymeric surfactants for lowering surface tension and improving jetting characteristics, including for example, polyoxyalkyleneamines (e.g., Jeffamine ED-600, Jeffamine ED-900, Jeffamine ED-2001, Jeffamine ED-4000), propoxylated (poly(oxypro pylene)) diamines (e.g., Jeffamine C-346), alkyl ether amines (e.g., Jeffamine M-2005, Jeffamine M-2070 available from Texaco Chemical Co.), nonyl phenol ethoxylates (e.g., Rexol 130 available from Hart Chemicals), ethoxylated fatty amines (e.g., Hartonyl L535 and Hartonyl L537 available from Hart), Luviquat FC370 (copolymer of 1-vinyl-3-methyl imidazolium chloride and vinylpyrrolidone in water), quaternized copolymers of vinylpyrrolidone and dimethyl aminoethyl methacrylate (e.g., Gafquat 755N and Gafquat 734 available from GAF Chemical Corporation), fluorinated organic acid diethanolamine salts (e.g., Lodyne P201E available from Ciba-Geigy), alkoxylated ethylenediamines (e.g., Tetronic 908 available from BASF), Petrowet R, sodium cumene sulfonates (e.g., Witconate SCS from Witco Corp.), Monamine ALX 100S, Monafax 1214, Monafax 1293 (available from Mona Industries, Inc.), polyethylene oxides, polyoxyalkylene polyalkylene polyamines amines $(C_2H_4N)_n$—(-$PO)_x$—$(EO)_y$—OH (e.g., Discole N-503, N-506, N-509, N-512, N-515, N-518, N-520), polyoxyalkylene polyalkylene polyimines $(C_2H_4N)_n$—$C_2H_4N$—$((AO)_x(EO)_y$-$OH)_2$ (e.g., Discole N-206, Discole W-3225 available from Dai-Ichi Kogyo Seiyaku Co., Ltd. (DKS International)), alcohol sulfate sodium salts (e.g., Duponol Me Dry, Duponol D Paste), alcohol ether sulfate sodium salts (e.g., Duponol RA), alcohol sulfate amine salts (e.g., Duponol G available from duPont), nonionic surfactants containing alkyl phosphate ethoxylate mixtures (e.g., Merpol A available from duPont), dipropylene glycol methyl ether/(2-methoxy-methylethoxy)-propanol (e.g., Dowanol DPM from Dow), polyoxyalkylene derivatives of propylene glycol (e.g. Pluronics), Strodex, Arcosolv, polyoxyethylated fatty alcohols (e.g., Peregal 0), etc. The surfactants, if used, are present in an amount from about 0.01% to about 5.0% by weight and preferably from about 0.1% to about 3% by weight of the total composition. However, the ink compositions of the invention can meet the above criteria without the use of surfactants.

Polymeric additives can be added to inks to enhance their viscosity. Such additives include water soluble polymers such as gum arabic, polyacrylate salts, polymethacrylate salts, polyvinyl alcohols, hydroxy propyl cellulose, hydroxyethylcellulose, polyvinylpyrrolidinone, polyvinylether, starch, polysaccharides, and the like.

Other optional additives to inks include biocides such as Dowicil 150, 200, and 75, benzoate salts, sorbate salts, sodium omadine, and the like, present in an amount of from about 0.0001 to about 4 percent by weight, and preferably from about 0.01 to about 2.0 percent by weight, humectants and penetration control additives such as ethylene glycol, diethylene glycol, N-methyl pyrrolidinone, propylene glycol, hydroxyethers, ethers, amides, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 5 to about 40 percent by weight; pH controlling agents such as acids or bases, phosphate salts, carboxylate salts, sulfite salts, amine salts and the like, present in an amount of from 0 to about percent by weight and preferably from about 0.01 to about 1 percent by weight; or the like.

The colorant may be any material which permits the development of visible images on a recording medium such as paper. The colorant may include dyes, pigments, and the like. The colorant is preferably a dye. Generally, any effective dye, such as one of the direct, acid or reactive dyes, can be selected as the colorant, provided that it is compatible with the other ink components and is soluble in the ink vehicle. Examples of suitable dyes include anthraquinones, monoazo dyes, disazo dyes, phthalocyanines, aza(18)annulenes, and formazan copper complexes. Particularly preferred dyes which may be used in the ink compositions of the invention include, for example, Food Black #2, Direct Black (DB) 168, 19, 154, 38, Acid Blue 9 (triphenyl methane dye), Projet Cyan, Projet Magenta, Acid Yellow 23. Preferred reactive dyes include vinylsulfonyl, trichloropyrimidine, dichlorotriazinyl and chlorotriazinyl dyes.

Inks can be prepared by any process suitable for preparing aqueous-based inks. For example, the ink ingredients can be mixed in the desired amounts and stirred until a uniform ink composition results (typically about 30 minutes or more, preferably about 2 hours at about 50° C., although the mixing/stirring time can be either greater or less than this). While not required, the ink ingredients can be heated during mixing if desired. Subsequent to mixing and stirring, the ink composition generally is filtered, preferably with a 0.5 micrometer filter, to remove any solid or particulate matter. Any other suitable processes for preparing inks can also be employed.

The ink compositions of the invention preferably can be used in ink jet printing systems. Inks generally used in an ink jet printing system preferably are capable of being utilized without clogging or leaking in either the type of printing system which uses thermal energy to produce a vapor bubble in an ink-filled channel to expel a drop of ink, or the type of system which uses a piezoelectric transducer to produce a pressure pulse that expels droplets from a nozzle.

The invention will further be illustrated in the following, non-limiting examples, it being understood that these examples are intended to be illustrative only and that the invention is not intended to be limited to the materials, conditions, process parameters, and the like recited herein.

EXAMPLE I

A series of black, cyan, magenta and yellow Thermal Ink Jet (TIJ) inks is prepared containing 10% propylene carbonate, 3.0% Food Black #2 (or 3% Acid Yellow 23, or 35% Projet Magenta, or 30% Projet Cyan), 4% of a polymeric surfactant, Discole N-506, and deionized water. These inks have identical surface tensions of about 35.5 dynes/cm, viscosities ranging from about 1.8 to 1.9 centipoise and drying times on the order of 0.3 second. Each set of inks is printed on an experimental printer to give prints showing minimum intercolor bleeding and feathering. These inks can also jet at frequencies (Fmax) above about 5 KHz. Inks with the same basic composition are also prepared except that 0–1% by weight, preferably 0.02–0.06% by weight, sodium lauryl sulphate is used as a surfactant instead of the Discole N-506. These inks also give prints showing minimum feathering (printed on a Deskjet printer). Other co-solvents, at 15% in water, are used in the above formulations to prepare inks drying in less than 1 second. These co-solvents are identified in Table 1. It is also found that inks containing polymeric surfactants such as Discoles and Jeffamines improve the jetting characteristics of TIJ inks.

TABLE 1

1 ETHYLENE GLYCOL MONOMETHYL ETHER
2 PROPYLENE CARBONATE
3 TRIETHYLENE GLYCOL MONOMETHYL ETHER
4 PROPYLENE GLYCOL
5 DIPROPYLENE GLYCOL MONOMETHYL ETHER
6 PROPYLENE GLYCOL MONOMETHYL ETHER
7 2-AMINO-2-ETHYL-1,3-PROPANEDIOL
8 NMP (N-METHYL PYRROLIDINONE)
9 1,3-DIMETHYL-2-IMIDAZOLIDINONE
10 1-PROPANOL
11 MONATROPE 1296 (LOW FOAMING ORGANIC PHOSPHATE ESTER SURFACTANT FROM MONA INDUSTRIES, INC.)
12 1-(3-AMINOPROPYL)-2-PYRROLIDINONE
13 2-AMINO-2-METHYL-1-PROPANOL
14 BENZYL ALCOHOL
15 TRIS(HYDROXYMETHYL AMINO) METHANE
16 ETHYLENE CARBONATE
17 1-CYCLOHEXYL-2-PYRROLIDINONE
18 WITCONATE SCS (SODIUM CUMENE SULFONATE)
19 CYCLOHEXANONE
20 DEG-MBE
21 DEG-MBE/GLYCEROL (60/40)
22 GLYCEROL
23 DIETHYLENE GLYCOL
24 ETHYLENE GLYCOL
25 POLYETHYLENE GLYCOL
26 PROPYLENE GLYCOL MONOMETHYL ETHER
27 1-CYCLOHEXYL-2-PYRROLIDINONE/DISCOLE N-503
28 10% PROPYLENE CARBONATE/2% DISCOLE N-503
29 15% DEG-MBE/1% DISCOLE N-506
30 15% DEG-MBE/GLYCEROL (60/40)
31 15% DEG-MBE/1% SODIUM LAURYL SULFATE
32 15% DEG-MBE/1% DISCOLE N-503
33 15% PROPYLENE GLYCOL METHYL ETHER/3% DUPANOL RA
34 15% DEG-MBE/GLYCEROL (68/32)
35 PROPYLENE GLYCOL METHYL ETHER/1% DUPANOL D
36 15% 1-CYCLOHEXYL-2-PYRROLIDINONE/1% DISCOLE N-503
37 7% PROPYLENE CARBONATE/1% DISCOLE N-503
38 10% PROPYLENE CARBONATE/1% DISCOLE N-506

EXAMPLE II

Two series of inks are prepared. The first series has a vehicle that gives low viscosity inks, yet drying times are quite long. The inks of this series contain 3% dye and 5.25% diethylene glycol in deionized water. The second series of inks is made using. 6% DEG-MBE and 4% glycerol in deionized water. These inks have much shorter drying times, and viscosities of 1.45–1.55 centipoise, and therefore jet better in a printhead due to reduced printhead face wetting at higher viscosity for inks of low surface tension. The table below compares the drying times of these two vehicles.

| | | | | Drying Time (sec) | | | | |
|---|---|---|---|---|---|---|---|---|
| | | Surface Tension | Viscosity | A | | B | | C | |
| | Dye | (dynes cm$^{-1}$) | (cP) | WS | FS | WS | FS | WS | FS |
| Series #1 (CONTROL) | | | | | | | | | |
| KH1 | Food Black #2 | 58.7 | 1.08 | 21 | 20 | 25 | 46 | 2 | 1 |
| KH2 | Acid yellow 23 | 59.5 | 1.14 | 16 | 21 | 17 | 14 | 10 | 7 |
| KH3 | Acid Red 249 | 42.9 | 1.16 | 15 | 17 | 13 | 16 | 5 | 4 |
| KH4 | Direct Blue 199 | 55.9 | 1.42 | 16 | 21 | 17 | 14 | 11 | 6 |
| Series #2 | | | | | | | | | |
| KH5 | Food Black #2 (3%) | 38.7 | 1.48 | 1 | 1 | 1 | 1 | 1 | 1 |
| KH6 | Acid Yellow 23 (3%) | 42.5 | 1.42 | 1 | 1 | 1 | 1 | 1 | 1 |
| KH7 | Acid Red 249 (4%) | 38.6 | 1.51 | 1 | 1 | 1 | 1 | 1 | 1 |
| KH8 | Direct Blue 199 (3%) | 41.0 | 1.38 | 1 | 1 | 1 | 1 | 1 | 1 |

A = Brazil XED 518 Paper
B = Lock Haven 405813-4 Paper
C = IP Alkaline 4297-CDIM Paper
WS = Wire Side
FS = Felt Side From the two tables above, it is seen that when the vehicle contains 4% glycerol and 6% DEG-MBE (as in Series #2) the drying times on plain paper are significantly decreased. The decrease in the surface tension is an important factor in decreasing the drying time.

The inks prepared with the DEG-MGE and glycerol show significantly improved drying times on plain paper, and their viscosities are in a range that permits them to jet well in the printhead. If these viscosities are obtained by simply increasing the glycol concentration, the drying times may be one minute or longer on plain paper. The degree of intercolor bleeding is also minimized when the inks have such fast drying times.

What is claimed is:

1. An ink composition being free of surfactant, comprising dye, from about 50% to about 92% by weight of water and about 2% to about 40% by weight of at least one co-solvent, the composition having a viscosity of about 1.6 to about 2.5 centipoise at about 25° C., a surface tension of about 28 to less than about 35 dynes/cm, and a drying time of less than about 1 second on plain paper; said at least one cosolvent is selected from the group consisting of propylene carbonate, ethylene carbonate, 1-cyclohexyl-2-pyrrolidone, diethylene glycol monobutyl ether, isopropanol, 1-methyl-2-pyrrolidone, 2-amino-2methyl-1-propanol, methyl diethanol amine, pyrazole, benzyl alcohol, 1,3,-dimethyl-2-imidazolidinone, propylene glycol monomethyl ether, dipropylene glycol monomethyl ether, tripropylene glycol monomethyl ether, propylene glycol mono-t-butyl ether, ethylene glycol ethyl ether acetate, ethylene glycol methyl ether acetate, ethylene glycol butyl ether, diethylene glycol butyl ether acetate, propylene glycol methyl ether acetate, dipropylene glycol methyl ether acetate, tripropylene glycol methyl ether acetate, and mixtures thereof.

2. The ink composition of claim 1, wherein said cosolvent is present in an amount ranging from about 0.1% to about 15% by weight based on weight of the composition.

3. The composition of claim 1, wherein said at least one cosolvent comprises diethylene glycol monobutyl ether and glycerol.

4. The composition of claim 3, comprising about 3% to about 40% by weight of said diethylene glycol monobutyl ether and about 3% to about 16% by weight of said glycerol.

5. The composition of claim 1, wherein said at least one cosolvent is present in an amount ranging from about 10% to about 25% by weight.

6. The ink composition of claim 1, wherein said drying time is less than about 0.6 second.

7. The ink composition of claim 1, wherein the drying time is between about 0.2 and about 0.6 second.

8. An ink composition being free of sufactant, comprising a colorant, water and about 2% to about 40% by weight based on total weight of the composition of at least one cosolvent selected from the group consisting of propylene carbonate, ethylene carbonate, 1-cyclohexyl-2-pyrrolidone, 2-amino-2-methyl-1-propanol, pyrazole, benzyl alcohol, ethylene glycol ethyl ether acetate, ethylene glycol methyl ether acetate, ethylene glycol butyl ether, diethylene glycol monobutyl ether acetate, propylene glycol methyl ether acetate, dipropylene glycol methyl ether acetate, tripropylene glycol methyl ether acetate, and mixtures thereof having a viscosity of about 1.6 to about 2.5 centipoise at about 25° C., a surface tension of about 28-42 dynesw/cm, and a drying time of less than 1 second on plain paper.

9. An ink composition being free of surfactant, comprising an ink vehicle, a colorant, diethylene glycol monobutyl ether and glycerol, the composition having a viscosity of about 1.45 to about 3.0 centipoise at about 25° C.

10. The ink composition of claim 9, wherein said diethylene glycol monobutyl ether is present in an amount ranging from about 3% to about 40% by weight based on weight of the total composition.

11. The ink composition of claim 18, wherein said glycerol is present in an amount ranging from about 3% to about 16% by weight based on weight of the total composition.

12. The ink composition of claim 9, wherein said diethylene glycol monobutyl ether is present in an amount ranging from about 3% to about 40% by weight, and said glycerol is present in an amount ranging from about 3% to about 16% by weight, based on weight of the total composition.

13. An ink composition comprising an ink vehicle, a colorant, diethylene glycol monobutyl ether and glycerol, wherein a weight ratio of said diethylene glycol monobutyl ether to said glycerol is about 60:40.

14. The ink composition of claim 9, wherein said ink vehicle is water based.

15. The ink composition of claim 9, wherein said colorant is a dye.

16. The ink composition of claim 18, having a viscosity of about 1.45 centipoise to about 1.55 centipoise at about 25° C. and a surface tension of about 28 to about 45 dynes/cm.

17. The ink composition according to claim 13, wherein said diethylene glycol monobutyl ether and said glycerol are present in a combined amount of from about 8% to about 25% by weight of the composition.

18. An ink composition, comprising dye, about 50% to about 92% by weight of water and about 2% to about 40% by weight of at least one co-solvent, about 0.02% to about 0.06% by weight of at least one surfactant, the composition having a viscosity of about 1.6 to about 2.5 centipoise at about 25° C., a surface tension of about 28 to less than about 35 dynes/cm, and a drying time of less than about 1 second on plain paper.

19. The ink composition of claim 18, wherein the composition has a frequency response of at least 5 KHZ.

20. An ink composition comprising dye, about 50% to about 92% by weight of water and about 2% to about 40% by weight of at least one co-solvent, and about 0.01% to about 5.0% by weight of a polymeric surfactant, the composition having a viscosity of about 1.6 to about 2.5 centipoise at about 25° C., a surface tension of about 28 to less than about 35 dynes/cm, and a drying time of less than about 1 second on plain paper.

21. An ink composition being free of surfactant, comprising water, dye and about 2% to about 40% by weight of at least one co-solvent, the composition having a viscosity of about 1.6 to about 2.5 centipoise at about 25° C., a surface tension of about 28 to less than about 35 dynes/cm, and a drying time of less than about 1 second on plain paper;

said at least one co-solvent is selected form the group consisting of propylene carbonate, ethylene carbonate, 1-cyclohexyl-2-pyrrolidone, diethylene glycol monobutyl ether, isopropanol, 1-methyl-2-pyrrolidone, 2-amino-2-methyl-1-propanol, methyl diethanol amine, pyrazole, benzyl alcohol, 1,3-dimethyl-2-imidazolidinone, propylene glycol monomethyl ether, dipropylene glycol monomethyl ether, tripropylene glycol monomethyl ether, propylene glycol mono-t-butyl ether, ethylene glycol ethyl ether acetate, ethylene glycol methyl ether acetate, ethylene glycol butyl ether, diethylene glycol butyl ether acetate, propylene glycol methyl ether acetate, dipropylene glycol methyl ether acetate, tripropylene glycol methyl ether acetate, and mixtures thereof; and at least one member selected from the group consisting of glycerol, D-sorbitol, ethylene glycol and propylene glycol.

22. An ink composition being free of surfactant, comprising water, dye and about 2% to about 40% by weight of at least one co-solvent, the composition having a viscosity of about 1.6 to about 2.5 centipoise at about 25° C., a surface tension of about 28 to less than about 35 dynes/cm, and a drying time of less than about 1 second on plain paper;

said co-solvent is selected from the group consisting of propylene carbonate, ethylene carbonate, 1-cyclohexyl-2-pyrrolidone, 2-amino-2-methyl-1-propanol, pyrazole, benzyl alcohol, ethylene glycol ethyl ether acetate, ethylene glycol methyl ether acetate, ethylene glycol butyl ether, diethylene glycol monobutyl ether acetate, propylene glycol methyl ether acetate, dipropylene glycol methyl ether acetate, tripropylene glycol methyl ether acetate, and mixtures thereof.

* * * * *